United States Patent
Rambler et al.

(10) Patent No.: US 11,567,562 B2
(45) Date of Patent: Jan. 31, 2023

(54) SELF-CHECKOUT TERMINAL SLEEP AND WAKE OPERATIONS

(71) Applicant: NCR Corporation, Atlanta, GA (US)

(72) Inventors: Mark Allen Rambler, Decatur, GA (US); John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 525 days.

(21) Appl. No.: 16/456,181

(22) Filed: Jun. 28, 2019

(65) Prior Publication Data

US 2020/0409449 A1  Dec. 31, 2020

(51) Int. Cl.
*G06F 1/00* (2006.01)
*G06F 1/3296* (2019.01)
*G06Q 20/20* (2012.01)

(52) U.S. Cl.
CPC ......... *G06F 1/3296* (2013.01); *G06Q 20/202* (2013.01)

(58) Field of Classification Search
CPC .................................................. G06F 1/3296
See application file for complete search history.

(56) References Cited

U.S. PATENT DOCUMENTS

| | | | | |
|---|---|---|---|---|
| 6,456,981 B1* | 9/2002 | Dejaeger | ............... | G06Q 30/02 705/14.38 |
| 7,245,207 B1* | 7/2007 | Dayan | ................ | B60R 11/0235 340/435 |
| 9,004,353 B1* | 4/2015 | Block | ................. | G06Q 20/308 382/137 |
| 9,143,344 B2* | 9/2015 | Cho | ..................... | H04L 12/2829 |
| 9,749,528 B1* | 8/2017 | Fink | ...................... | G06F 1/3206 |
| 10,798,774 B2* | 10/2020 | Ang | ......................... | H04L 5/001 |
| 2008/0189563 A1* | 8/2008 | Itkin | ..................... | G06F 1/3203 713/300 |
| 2012/0116887 A1* | 5/2012 | Norair | ................. | G06Q 20/322 455/41.1 |
| 2012/0210154 A1* | 8/2012 | Hartwich | ......... | H04L 12/40039 713/323 |
| 2012/0290444 A1* | 11/2012 | Nelson | .............. | G06Q 30/0601 705/27.1 |
| 2014/0198960 A1* | 7/2014 | Thompson | ............. | G06V 40/13 382/124 |
| 2015/0248207 A1* | 9/2015 | Dorfner | .................. | G06F 3/043 345/174 |
| 2017/0200152 A1* | 7/2017 | Winkler | ............. | G06Q 20/3278 |
| 2017/0340267 A1* | 11/2017 | Shen | ..................... | A61B 5/7445 |
| 2018/0165655 A1* | 6/2018 | Marcelle | ............. | G06K 7/1417 |
| 2018/0225615 A1* | 8/2018 | Thomas | ............. | G06Q 30/0201 |
| 2019/0228773 A1* | 7/2019 | Gao | ......................... | G10L 15/22 |
| 2021/0067746 A1* | 3/2021 | Yones | .................... | H04N 9/045 |

* cited by examiner

*Primary Examiner* — Mohammed H Rehman
(74) *Attorney, Agent, or Firm* — Schwegman, Lundberg & Woessner

(57) ABSTRACT

Disclosed are self-checkout terminals and systems and methods for controlling the same. The systems and methods may include receiving a first image of the customer queuing area from the first camera and determining that a customer is in the customer queuing area. A first wakeup signal may be transmitted to one of the self-checkout terminals when the customer is in the customer queuing area. A second image of the customer queuing area may be received from the first camera and a determination may be made that the customer queuing area is void of customers. A first sleep signal may be transmitted to the one of the self-checkout terminals when the customer queuing area is void of the customers.

17 Claims, 4 Drawing Sheets

SELF-CHECKOUT TERMINAL SLEEP AND WAKE OPERATIONS

SUMMARY

Disclosed are self-checkout terminals and systems and methods for controlling the same. The systems and methods may include receiving a first image of the customer queuing area from the first camera and determining that a customer is in the customer queuing area. A first wakeup signal may be transmitted to one of the self-checkout terminals when the customer is in the customer queuing area. A second image of the customer queuing area may be received from the first camera and a determination may be made that the customer queuing area is void of customers. A first sleep signal may be transmitted to the one of the self-checkout terminals when the customer queuing area is void of the customers.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
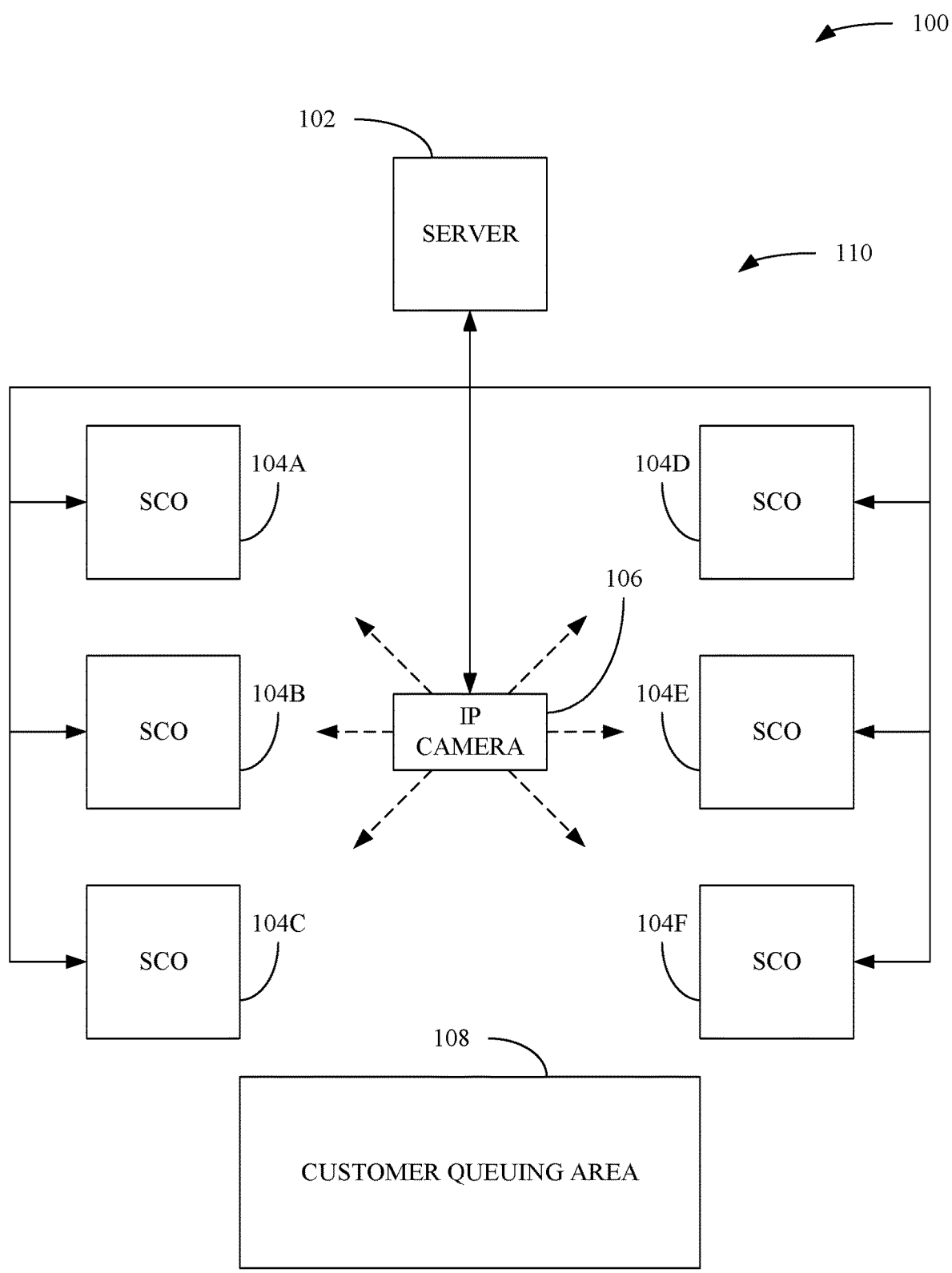
FIG. 1 shows an example schematic of a self-service checkout area consistent with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Self-checkout terminals (SCO) may include processing systems that may support various power savings features. However, one difficulty to using these features may be that each configuration requires more time and control to return to full-power operation mode. When a customer approaches a SCO, the SCO is expected to be ready to operate the moment an item is presented to the scanner. Given the lag time in powering up the SCO, there may not be enough time for the processor to wake from any power savings configuration.

The power saving configurations, sometimes referred to as sleep stages, may range from lower-power idle to sleep to deep sleep to power-down to suspend to memory, etc. Each configuration may require less power than the last. Various other components in the system, as well as the display, may each contain their own power savings modes in addition to the processor. All these power savings modes may assist the SCO with decreasing its overall power usage.

As disclosed herein, a camera may be electrically coupled to the SCO via a connection, such as a wired or wireless connection, an Ethernet connection, etc. which could be used to alert the system that a customer is approaching. For example, the camera may be one of a plurality of IP cameras located throughout the store or arranged to capture images of a customer queuing area as disclosed herein. Using the camera, a determination may be made as to when a customer is approaching the SCO. As a result, upon determining that a customer is approaching the SCO can wake from one of the various sleep stages and be ready to proceed with a transaction.

Using the systems and methods disclosed herein result in an improvement in to existing systems by allowing for reduced power consumption, which in turn increases the life of the hardware due to less hours of full-power operation.

As disclosed herein, a remote computer, such as a server, may be connected to a camera, such as an overhead video-over-Ethernet camera, and may detect customer activity and coordinate SCO lane sleep and wake activity among multiple SCO lanes in a bullpen area to save power. The systems and methods disclosed herein, may detect customer queuing and adjusts SCO lane sleep and operating modes to minimize checkout time. The systems and method may also coordinate with other systems to identify high risk shoppers and re-direct them to a more secure SCO lane or assisted checkout.

As disclosed herein, SCO systems may have multiple sleep states with each state corresponding to a different level of sleep. Depending on the level of sleep, it may take anywhere from 20-30 seconds to wake up a SCO. For example, a SCO terminal in a deep sleep may take 30 seconds to wake up or power up to full power and be ready to process transactions. The systems and methods disclosed herein may allow for lanes to start waking up before customers get close enough to notice that the SCO was asleep.

In addition to customer activity monitoring, using images captured from the cameras, the system may track SCO lane attendants to enable automatic SCO login during interventions. For example, it may take several seconds for lane attendants to log into a SCO to handle an intervention. To speed up this process, cameras may be used to monitor the position of attendants within a bullpen of SCO terminals. The attendants may be tracked and/or distinguished from customers due to smocks or other distinguishing clothing worn by the attendants that are customarily not worn by customers.

Turning now to the figures, FIG. 1 shows an example schematic of a self-service checkout area 100 consistent with embodiments disclosed herein. Self-service checkout area 100 may include a server 102, SCO terminals 104 (individually, 104A, 104B, etc.), cameras 106, and a customer queuing area 108. SCO terminals 104 and cameras 106 may communicate with server 102 via an Ethernet connection, a wired or wireless connection, etc.

While cameras 106 is shown as a single block located in a central portions of self-service checkout area 100 with each camera pointed at a respective SCO terminal and customer queuing area 108, cameras 106 may be disbursed throughout self-service checkout area 100. For example, each of cameras 106 may be located proximate a respective SCO terminal and customer queuing area 108. Still consistent with embodiments disclosed herein, cameras 106 may be located outside of self-service checkout area 100, with or without view of SCO terminals 104. For example, customer behavior can be monitored at an entry/exit location in the store and one of SCO terminals 104 may be activated when a customer enters the store.

While FIG. 1 shows server 102 located proximate self-service checkout area 100, server 102 need not be located proximate self-service checkout area 100. For example, server 102 may be located in a computer room onsite at a store or brick and mortar establishment where goods or services may be purchased. In addition, server 102 may be located offsite and communicate with SCO terminals 104 and cameras 106 via a network such as the Internet.

As shown in FIG. 1, the SCO terminals 104 (sometimes referred to as SCO lanes) may be located in a bullpen 110, which may be a cluster of SCO terminals. SCO terminals 104 may also be located throughout a store or other establishment and cameras 106 may be positioned accordingly to capture images of customer queuing areas that may be located proximate the distributed SCO terminals 104.

As disclosed herein, cameras 106 may capture images of customer queuing area 108 and the images may be transmitted to the server 102. Server 102 may process the images to determine if a customer is located in customer queuing area 108 or if customer queuing area 108 is void of customers. Server 106 may be a standalone server used to control waking and putting to sleep SCO terminals 104. Server 106 may also be a server that controls various aspects of SCO terminal operations. For example, server 106 may control the waking and putting to sleep of SCO terminals 104 as well as control loss/theft prevention systems, transactions processes, etc. that may be associated with operation of the SCO terminals 104.

Cameras 106 may be "smart cameras" that may include a processor and may be able to process images without sending them to server 102. Thus, cameras 106 may process images and send one or more signals to server 102. The one or more signals may include data that indicates whether or not a customer is located in customer queuing area 108. Using the received signals, server 102 may transmit one or more signals to one or more of the SCO terminals 104 to wake or put to sleep one or more of SCO terminals 104 or log in an attendant as disclosed herein.

Cameras 106 may also transmit raw images to server 102. For example, cameras 106 may be USB webcams mounted on light poles of the SCO terminals 104 and may capture raw images of SCO terminals 104 and customer queuing area 108. The raw images may be transmitted to server 102 for processing. Upon processing by server 102, one or more signals may be transmitted to SCO terminals 104 to wake or put to sleep one or more of SCO terminals 104 or log in an attendant as disclosed herein. Still consistent with embodiments disclosed herein, any one of SCO terminals 104 may be server 102 with the necessary software running on the SCO terminal.

During operations, each of SCO terminals 104 may be in different stages of sleep. For example, SCO terminals 104A and 104D may be in a deep sleep because they are furthest from customer queuing area 108 and no customers are present in customer queuing area 108. SCO terminals 104C or 104F may be in a stage of light sleep where only their displays are asleep. As a customer enters customer queuing area 108, the displays for SCO terminals 104C or 104F may wake so that the customer may use either SCO terminals 104C or 104F. Instead of both SCO terminals 104C and 104F awakening, only one of them may awake to serve the customer. When SCO terminals 104C and 104F awaken, SCO terminals 104B and 104E may awaken to a state where only their screens are asleep. Thus, when more customers enter customer queuing area 108, SCO terminals 104B and 104E may awaken their displays to be ready for service. This staggered stages of sleep for each of SCO terminals 104 may allow for reduced wake up times as customers enter customer queuing area 108 while allowing for reduced power consumption by SCO terminals 104.

In addition, when any of SCO terminals 104 experiences a condition that may require an attendant to intervene, server 102 may also transmit log in information to the SCO terminal upon the attendant approaching it. For example, if a customer scans an item that requires age verification (e.g., tobacco products, alcohol, spray paints, etc.), the SCO terminal may activate a light on a light post proximate the SCO terminal to alert the attendant that assistance is needed. At the same time, the SCO terminal may transmit a signal to server 102 indicating assistance from the attendant is needed. Upon receiving the signal, server 102 may monitor the location of the attendant and when the attendant is within a preset distance (e.g., less than 1 foot), server 102 may automatically log the attendant into the SCO. This may improve checkout efficiency by reducing the time needed for the attendant to intervene as needed because the attendant will not need to enter login information.

Figure 2:
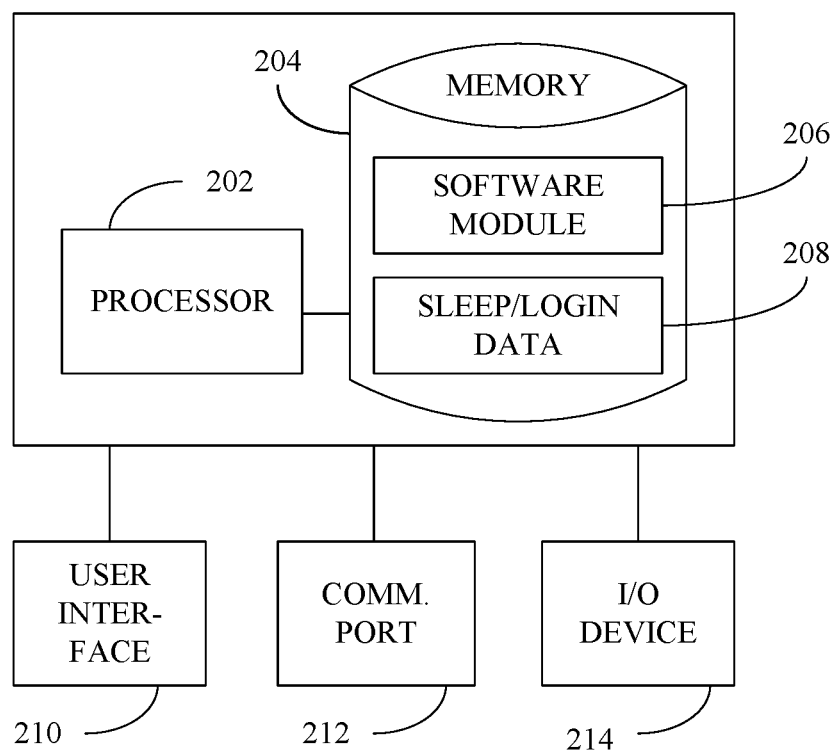
FIG. 2 shows an example schematic of a computing device consistent with embodiments disclosed herein.

Turning now to FIG. 2, FIG. 2 shows an example schematic of server 102 consistent with embodiments disclosed herein. As shown in FIG. 2, server 102 may include a processor 202 and a memory 204. Memory 204 may include a software module 206 and sleep or login data 208. While executing on processor 202, software module 206 may perform processes for waking or putting to sleep a SCO terminal or logging an attendant into a SCO terminal, including, for example, one or more stages included in methods 300 and 400 described below with respect to FIGS. 3 and 4. Server 102 may also include a user interface 210, a communications port 212, and an input/output (I/O) device 214.

User interface 210 can include any number of devices that allow a user to interface with server 102. Non-limiting examples of user interface 210 include a keypad, a microphone, a display (touchscreen or otherwise), etc.

Communications port 212 may allow server 102 to communicate with various information sources and devices, such as, but not limited to, remote computing devices, mobile devices, peripheral devices, cameras (such as cameras 106), SCO terminals (such as SCO terminals 104), etc. Non-limiting examples of communications port 212 include, Ethernet cards (wireless or wired), Bluetooth® transmitters and receivers, near-field communications modules, etc. User interface 210 may also use communications port 212 to communicate with server 102. For example, user interface 210 may be a tablet computer that includes a virtual keyboard that communicates with server 102 via communications port 212.

I/O device 214 may allow server 102 to receive and output information. Non-limiting examples of I/O device 214 include, cameras (such as cameras 106), SCO terminals (such as SCO terminals 104), a weight detection device such as a scale, a printer for printing receipts, and packing lists, etc. I/O device 214 may also utilize communications port 212 to communicate with server 102. For example, I/O device 214 may be cameras 106 that uses communications port 212 to communicate with sever 102 via a wired or wireless connection.

Sleep/login data 208 may include power settings for each of SCO terminals 104, login credentials for the attendant, background images of customer queuing area 108, etc. The background images may be used for comparison to images captured by cameras 106 to determine if customers are or are not located in customer queuing area 108. The login credentials may be provided by the attendant at the beginning of his or her shift. Login credentials may also include images of a smock or other features of a uniform the attendant may wear that allow server 102 to distinguish the attendant from customers.

Figure 3:
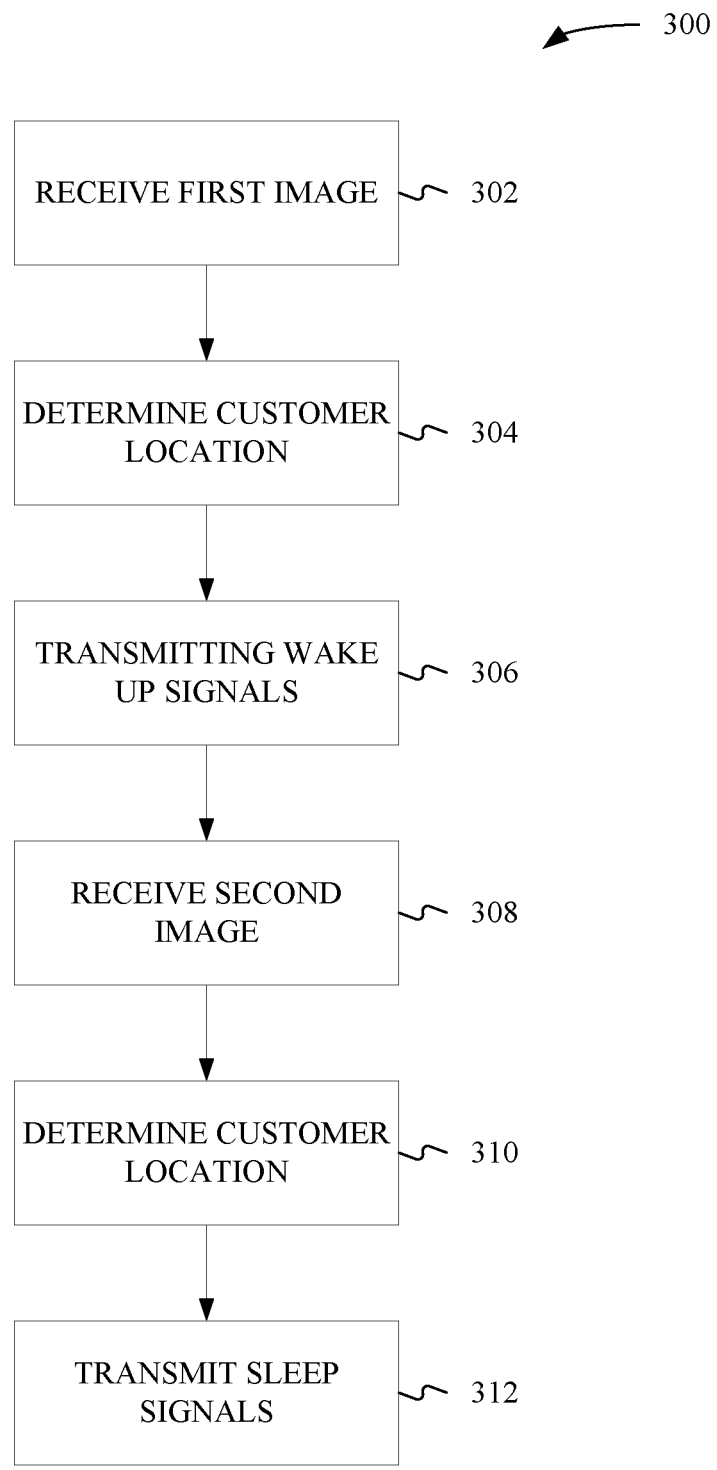
FIG. 3 shows an example method consistent with embodiments disclosed herein.

Turning now to FIG. 3, FIG. 3 shows an example method 300 for waking or putting to sleep a SCO terminal consistent with embodiments disclosed herein. Using the systems and components disclosed herein, method 300 may coordinate sleep and wake behavior among multiple SCO terminals, such as SCO terminals 104 according to various rules. Using the rules, a server, such as server 102 may wake SCO terminals up when customers approach and puts SCO terminals to sleep when customers leave by sending wake and sleep signals, such as Ethernet commands to the SCO terminals.

Method 300 may include the server receiving first images (302), such as a first image, from one or more cameras, such as cameras 106. The first images may be of the SCO terminals as well as a customer queuing area, such as customer queuing area 108. Using the first images, the server can determine locations of customers. For example, using the first images, the server may determine if there is a customer in or approaching the customer queuing area or proximate any one of the SCO terminals (304).

Once a determination has been made that a customer is in or approaching the customer queuing area or proximate any one of the SCO terminals, wake up signals may be transmitted (306). The wake up signals may include commands that cause each of the SCO terminals to enter one of a variety of sleep stages. For example, each of the SCO terminals may be in a sleep state. For instance, one or more of the SCO terminals closest to the customer queuing area may be in a light sleep where only the display is asleep. SCO terminals furthest from the customer queuing area may be in a deep sleep where the processors, memory, and displays are powered down.

When a determination is made that a customer is approaching or in the checkout area, the wake up signals may be transmitted to one or more of the SCO terminals. For example, as a first customer approaches the customer queuing area, a first SCO terminal (e.g., the SCO terminal closest to the customer queuing area) may be woken up to a full power state via a first wake up signal. A second wake up signal may wake a second SCO terminal closest to the first SCO terminal to another state. For example, the second SCO terminal may be woken to a state were only its display is asleep. Each of the other SCO terminals in the bullpen may be woken to various states in a similar manner as more customers approach the bullpen.

The SCO terminal closest to the customer queuing area need not be the SCO terminal that is woken at any given time. Using the images received, the server may calculate the customer's velocity and direction over multiple frames to confirm the customer is walking towards the bullpen or any one of the SCO terminals so as to determine which of the SCO terminals to wake up.

The wake up commands may include other commands as well. For example, when a SCO terminal is woken to a full power state, a command may be sent so that the SCO terminals speaks a welcome message as the customer approaches the SCO terminal or the customer stands close to the SCO terminal.

Having the SCO terminals in various stages of sleep may allow for the server to ensure there are always a minimum number of SCO terminals, for example the two closest to the customer queueing area, awake in the bullpen. This may allow customers to know the SCO terminals are available for use.

During use the server may continually receive images from the cameras. For example, the server may receive second images (308). By continually receiving images, the server may determine when SCO terminals may be put to sleep. For instance, the server may use rules to determine when to put lanes back to sleep. Using the images, the server may determine that the customer queuing area and/or the bullpen is void of customers (310). When no customers are located near the SCO terminals, or there are no customers within the store, sleep signals may be transmitted (312) so that SCO terminals may be put to sleep as disclosed herein.

For example, if no customers are nearby, the server may put SCO terminals to sleep "quickly," for example after 5 minutes. If customers are loitering proximate to SCO terminals, but not using the lanes, the server may put SCO terminals to sleep "slowly," for example after 20 minutes.

The server may layer business rules on top of customer activity rules. For example, the server may put all SCO lanes to sleep after store closing time, plus 10 minutes after the last customer is detected in the bullpen area. Or, in a 24-hour store with multiple SCO bullpen areas, the server might turn off all SCO terminals in one or more of the multiple bullpens after 10 PM if customer traffic is light.

The server may also track attendants as disclosed herein so as not to wake a SCO terminal for an attendant unless certain rules are met. By tracking attendants, the server may avoid inadvertently waking SCO terminals as they pace around the bullpen area. For example, the server may only wake a SCO terminal when the attendant can be seen on one or more of the images received extending their hand towards the SCO terminal or components of the SCO terminal such as a touch screen, or when the attendant is very close (e.g., within inches or less than a foot) to the SCO terminal.

Method 300 may also allow for optimizing SCO terminals to handle customer queuing. For example, the server may apply additional rules to handle the customer queuing area. During initial system installation, installer may run a utility on the server that displays the camera field of view and allows the installer to draw a virtual camera "hot spot" area where customers are expected to queue up waiting for SCO terminals. This hot spot may be the customer queuing area as disclosed herein. During runtime, the server may use the received images and count the number of customers in the queueing area and wake up enough SCO terminals to cover the number of queued customers plus an extra SCO terminal to accommodate the next customer. Stated another way, the server may power up the number of customers plus N SCO terminals, where N is typically 1.

If SCO terminals are out of service and the server detects the number of customers in the customer queuing area is growing, the server may transmit a signal to a mobile device operated by the attendant to page the attendant to tell them to put more SCO terminals into service. "Put into service"

may mean an attendant logs into the SCO lane and touches a button that makes the SCO terminal available for customers to use. At the start of each business day, SCO terminals may be out of service after nightly reboots or end-of-day activities from the previous business day.

If the server detects many customers waiting in the customer queuing area, the server may attempt to speed up throughput by sending Ethernet commands to selected SCO terminals to convert them into "2 items or less," "card-only," or "cash-only" modes.

Method 300 may also be used for coordination with frictionless shopping. For example, the systems and component of the systems may be combined with "frictionless shopping," or "Amazon go" type systems that track where customers have been and what shopping items they took using a network of cameras and sensors. If the frictionless shopping system detected that a customer visited a high-theft area of a store, for example razor blades, electronics, etc., the server might choose to enable a SCO terminal closest to an attendant station, or a SCO terminal with enhanced security features for that customer. This is possible because stores may have a mix of SCO terminals with different capabilities, for example card-only SCO terminals with handheld scanners, next to cash/card lanes with imaging scanners enabled with enhanced security features. In some instances, the server may instruct the SCO terminals to block the customer from using self-checkout, and direct them to an assisted lane.

Figure 4:
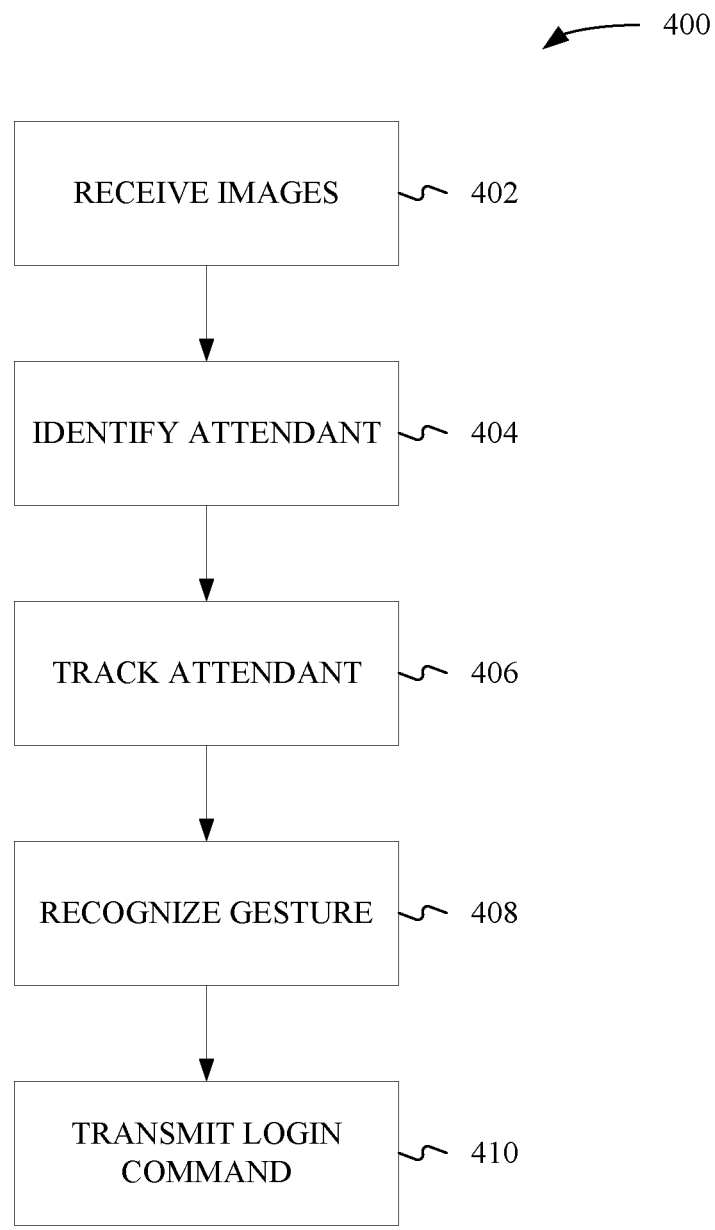
FIG. 4 shows an example method consistent with embodiments disclosed herein.

Turning now to FIG. 4, FIG. 4 shows an example method 400 for logging an attendant into a SCO terminal consistent with embodiments disclosed herein. Method 400 may include receiving a plurality of images (402). Using the images, the attendant may be identified (404). For example, the server may initially identify the attendant when he or she manually logs into a SCO terminal at the beginning of his or her shift or after returning from a break. Using an image of the SCO terminal taken at the time the attendant logs in, a feature of the attendant, such a smock or markings on a uniform may be identified. This feature may be identified in subsequent images to track the attendant as he or she moves around the bullpen area. If the server loses track of the attendant, then the attendant may be treated as a customer until the attendant manually logs into a SCO terminal again. The server may also reacquire the attendant using images received by the server.

By knowing where the attendant is, the server can provide automatic attendant login. Using the images, the server can track the attendant (406) and recognize when the attendant walks to one of the SCO terminals and recognize a predefined gesture (408). For example, the server may recognize when the attendant lifts his or her arm to touch a display of the SCO terminal.

Upon recognizing the gesture, the server may transmit a login command (410) to the SCO terminal. For example, upon the server recognizing the arm motion it may transmit a signal that includes a command for the SCO terminal to enter intervention mode without requiring a username or password. The SCO terminal may have a "secret" part of the SCO screen that the attendant may have to touch to initiate the intervention mode. For example, a company logo in the upper-left corner of the screen may act as an icon that is activated upon receiving the login command. Having the secret part of the screen that the attendant must touch may act to prevent customers from accidentally entering intervention mode when the attendant is standing close to the customer or if the server mis-identifies a customer as an attendant. In addition to or as an alternative to the secret part of the screen, the attendant may have to scan an access card or other credential.

Certain security-critical interventions may require a username and password for login. For example, putting a lane into service in the morning or intervening in case of a suspicious shoplifting activity may require a username and password.

EXAMPLES

Example 1 is a method comprising: receiving, at a computing device from a camera, an image of a customer queuing area; determining, by the computing device, that a customer is in the customer queuing area; transmitting, by the computing device, a first wakeup signal to one of a plurality of self-checkout terminals when the customer is in the customer queuing area; and waking the one of the plurality of self-checkout terminals in response to transmitting the first wake up signal.

In Example 2, the subject matter of Example 1 optionally includes wherein transmitting the first wakeup signal to the one of the self-checkout terminals includes transmitting the first wakeup signal to a self-checkout terminal closest to the customer.

In Example 3, the subject matter of any one or more of Examples 1-2 optionally include wherein the first wakeup signal includes an indication of an awake stage from a plurality of awake stages, and wherein waking the one of the plurality of self-checkout terminals includes waking the one of the plurality of self-checkout terminals to the awake stage.

In Example 4, the subject matter of any one or more of Examples 1-3 optionally include transmitting a second wakeup signal to a second one of the plurality of self-checkout terminals.

In Example 5, the subject matter of any one or more of Examples 1-4 optionally include transmitting a first sleep signal to the one of the plurality of self-checkout terminals.

In Example 6, the subject matter of any one or more of Examples 1-5 optionally include wherein determining that a customer is in the customer queuing area includes determining a proximity of the customer to the one of the plurality of self-checkout terminals.

Example 7 is a method comprising: receiving, at a computing device from a camera, an image of a customer queuing area; determining, by the computing device, that the customer queuing area is void of customers; transmitting, by the computing device, a first sleep signal to one of a plurality of self-checkout terminals when the customer queuing area is void of the customers; and putting to sleep the one of the plurality of self-checkout terminals in response to transmitting the first sleep signal.

In Example 8, the subject matter of Example 7 optionally includes wherein transmitting the first sleep signal to the one of the self-checkout terminals includes transmitting the first sleep signal to a self-checkout terminal furthest from the customer queuing area.

In Example 9, the subject matter of any one or more of Examples 7-8 optionally include wherein the first sleep signal includes an indication of a sleep stage from a plurality of sleep stages, and wherein putting to sleep the one of the plurality of self-checkout terminals includes power down the one of the plurality of self-checkout terminals to the sleep stage.

In Example 10, the subject matter of any one or more of Examples 7-9 optionally include transmitting a second sleep signal to a second one of the plurality of self-checkout terminals.

In Example 11, the subject matter of any one or more of Examples 7-10 optionally include transmitting a first wake signal to the one of the plurality of self-checkout terminals.

Example 12 is a system for controlling a plurality of self-checkout terminals, the system comprising: a first camera arranged to capture images of a customer queuing area; a processor; and a memory that stores instructions that, when executed by the processor, cause the processor to perform actions comprising: receiving a first image of the customer queuing area from the first camera, determining that a customer is in the customer queuing area, transmitting a first wakeup signal to one of the plurality of self-checkout terminals when the customer is in the customer queuing area, receiving a second image of the customer queuing area from the first camera, determining that the customer queuing area is void of customers, and transmitting a first sleep signal to the one of the plurality of self-checkout terminals when the customer queuing area is void of the customers.

In Example 13, the subject matter of Example 12 optionally includes the plurality of self-checkout terminals, wherein each of the plurality of self-checkout terminals is configured to wake or sleep in response to receiving the first wakeup signal or the first sleep signal.

In Example 14, the subject matter of any one or more of Examples 12-13 optionally include a plurality of cameras, the first camera being one of the plurality of cameras, each of the other plurality of cameras arranged to capture images of a respective one of the plurality of self-checkout terminals.

In Example 15, the subject matter of any one or more of Examples 12-14 optionally include wherein transmitting the first wakeup signal to the one of the self-checkout terminals includes transmitting the first wakeup signal to a self-checkout terminal closest to the customer.

In Example 16, the subject matter of any one or more of Examples 12-15 optionally include transmitting a second wakeup signal to a second one of the plurality of self-checkout terminals.

In Example 17, the subject matter of any one or more of Examples 12-16 optionally include wherein determining that the customer is in the customer queuing area includes determining a proximity of the customer to the one of the plurality of self-checkout terminals.

In Example 18, the subject matter of any one or more of Examples 12-17 optionally include wherein transmitting the first sleep signal to the one of the self-checkout terminals includes transmitting the first sleep signal to a self-checkout terminal furthest from the customer queuing area.

In Example 19, the subject matter of any one or more of Examples 12-18 optionally include transmitting a second sleep signal to a second one of the plurality of self-checkout terminals.

In Example 20, the subject matter of any one or more of Examples 12-19 optionally include wherein the first wakeup signal includes an indication of an awake stage from a plurality of awake stages, and wherein the first sleep signal includes an indication of a sleep stage from a plurality of sleep stages.

In Example 21, the systems, self-service terminals, or methods of any one of or any combination of Examples 1-20 are optionally configured such that all elements or options recited are available to use or select from.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
receiving, at a computing device from a camera, an image of a customer queuing area;
determining, by the computing device, that a customer is in the customer queuing area based upon the image containing the customer in the customer queuing area;
determining one of a plurality of self-checkout terminals the customer is approaching based on multiple frames of the customer in the customer queuing area;
transmitting, by the computing device, a first wakeup signal to the one of the plurality of self-checkout terminals when the customer is in the customer queuing area; and
waking the one of the plurality of self-checkout terminals in response to transmitting the first wake up signal,
wherein the first wakeup signal includes an indication of an awake stage from a plurality of awake stages, each of the plurality of awake stages corresponding to a different power consumption level, and
wherein waking the one of the plurality of self-checkout terminals includes waking the one of the plurality of self-checkout terminals to the awake stage.

2. The method of claim 1, wherein transmitting the first wakeup signal to the one of the self-checkout terminals includes transmitting the first wakeup signal to a self-checkout terminal closest to the customer.

3. The method of claim 1, further comprising transmitting a second wakeup signal to a second one of the plurality of self-checkout terminals.

4. The method of claim 1, further comprising transmitting a first sleep signal to the one of the plurality of self-checkout terminals.

5. The method of claim 1, wherein determining that a customer is in the customer queuing area includes determining a proximity of the customer to the one of the plurality of self-checkout terminals.

6. A method comprising:
receiving, at a computing device from a camera, an image of a customer queuing area;
determining, by the computing device, that the customer queuing area is void of customers based upon the image being void of the customers in the customer queuing area;
determining one of a plurality of self-checkout terminals the customer is approaching based on multiple frames of the customer in the customer queuing area;
transmitting, by the computing device, a first sleep signal to the one of the plurality of self-checkout terminals when the customer queuing area is void of the customers; and
putting to sleep the one of the plurality of self-checkout terminals in response to transmitting the first sleep signal,
wherein the first sleep signal includes an indication of a sleep stage from a plurality of sleep stages, each of the plurality of awake stages corresponding to a different power consumption level, and wherein putting to sleep the one of the plurality of self-checkout terminals includes power down the one of the plurality of self-checkout terminals to the sleep stage.

7. The method of claim 6, wherein transmitting the first sleep signal to the one of the self-checkout terminals includes transmitting the first sleep signal to a self-checkout terminal furthest from the customer queuing area.

8. The method of claim 6, further comprising transmitting a second sleep signal to a second one of the plurality of self-checkout terminals.

9. The method of claim 6, further comprising transmitting a first wake signal to the one of the plurality of self-checkout terminals.

10. A system for controlling a plurality of self-checkout terminals, the system comprising:
    a first camera arranged to capture images of a customer queuing area;
    a processor; and
    a memory that stores instructions that, when executed by the processor, cause the processor to perform actions comprising:
        receiving a first image of the customer queuing area from the first camera,
        determining that a customer is in the customer queuing area based upon the image containing the customer in the customer queuing area,
        determining one of the plurality of self-checkout terminals the customer is approaching based on multiple frames of the customer in the customer queuing area,
        transmitting a first wakeup signal to the one of the plurality of self-checkout terminals when the customer is in the customer queuing area,
        receiving a second image of the customer queuing area from the first camera,
        determining that the customer queuing area is void of customers, and
        transmitting a first sleep signal to the one of the plurality of self-checkout terminals when the customer queuing area is void of the customers,
    wherein the first wakeup signal includes an indication of an awake stage from a plurality of awake stages, each of the plurality of awake stages corresponding to a different power consumption level, and
    wherein the first sleep signal includes an indication of a sleep stage from a plurality of sleep stages.

11. The system of claim 10, further comprising the plurality of self-checkout terminals, wherein each of the plurality of self-checkout terminals is configured to wake or sleep in response to receiving the first wakeup signal or the first sleep signal.

12. The system of claim 10, further comprising a plurality of cameras, the first camera being one of the plurality of cameras, each of the other plurality of cameras arranged to capture images of a respective one of the plurality of self-checkout terminals.

13. The system of claim 10, wherein transmitting the first wakeup signal to the one of the self-checkout terminals includes transmitting the first wakeup signal to a self-checkout terminal closest to the customer.

14. The system of claim 10, further comprising transmitting a second wakeup signal to a second one of the plurality of self-checkout terminals.

15. The system of claim 10, wherein determining that the customer is in the customer queuing area includes determining a proximity of the customer to the one of the plurality of self-checkout terminals.

16. The system of claim 10, wherein transmitting the first sleep signal to the one of the self-checkout terminals includes transmitting the first sleep signal to a self-checkout terminal furthest from the customer queuing area.

17. The system of claim 10, further comprising transmitting a second sleep signal to a second one of the plurality of self-checkout terminals.

* * * * *